Dec. 24, 1940.  F. A. HASSMAN ET AL  2,226,431
LUBRICATING MECHANISM FOR MACHINE TOOLS
Filed Oct. 12, 1939

INVENTOR.
FRED A. HASSMAN
EDGAR D. VANCIL
BY A. H. Parsons
ATTORNEY.

Patented Dec. 24, 1940

2,226,431

UNITED STATES PATENT OFFICE 2,226,431

LUBRICATING MECHANISM FOR MACHINE TOOLS

Fred A. Hassman and Edgar D. Vancil, Cincinnati, Ohio, assignors to The Cincinnati Milling Machine Co., Cincinnati, Ohio, a corporation of Ohio Application October 12, 1939, Serial No. 299,182

7 Claims. (Cl. 90—11)

This invention relates to machine tools and more particularly to improvements in the lubrication of certain actuating parts thereof.

One of the objects of this invention is to provide improved lubricating means for a vertical elevating screw of a machine tool.

A more specific object of this invention is to provide improved lubrication for the knee elevating screw of a milling machine.

A further object of this invention is to provide improved pressure lubricating means for an actuable part of a machine which becomes effective only in response to actuation of the part.

Other objects and advantages of the present invention should be readily apparent by reference to the following specification, considered in conjunction with the accompanying drawing forming a part thereof and it is to be understood that any modifications may be made in the exact structural details there shown and described, within the scope of the appended claims, without departing from or exceeding the spirit of the invention.

Referring to the drawing in which like reference numerals indicate like or similar parts:

In certain types of machine tools a vertical elevating screw is utilized for effecting relative movement between a work support and a tool support, and this is especially true in milling machines of the knee and column type such as the one shown in United States Patent 1,997,338, issued April 9, 1935, and this invention is directed toward providing improved means for lubricating such a screw.

In a milling machine, the knee elevating screw is utilized more often to effect a positional adjustment, rather than to effect a power feeding movement and therefore its use is infrequent. In spite of this, it is highly desirable that the screw be adequately lubricated, especially during elevational movements because the load on the screw at this time creates a relatively large friction.

Heretofore, it has been difficult to provide satisfactory lubrication on account of the inaccessibility of the parts and on account of its infrequent use, which renders continuous lubrication somewhat wasteful. Furthermore, it has been impractical to provide continuous lubrication because it requires that the supply of oil be taken from the knee, and due to the vertical position of the screw the oil drains from the screw and is lost outside of the knee.

By means of this invention the lubricant is taken from the pedestal of the machine and circulated to the screw and allowed to drain or collect again in the pedestal, thereby forming a closed system. Means are also provided to cause circulation of this fluid only during rotation of the screw, and even then, only when the screw rotates in a direction to effect elevation of the knee.

Figure 1:
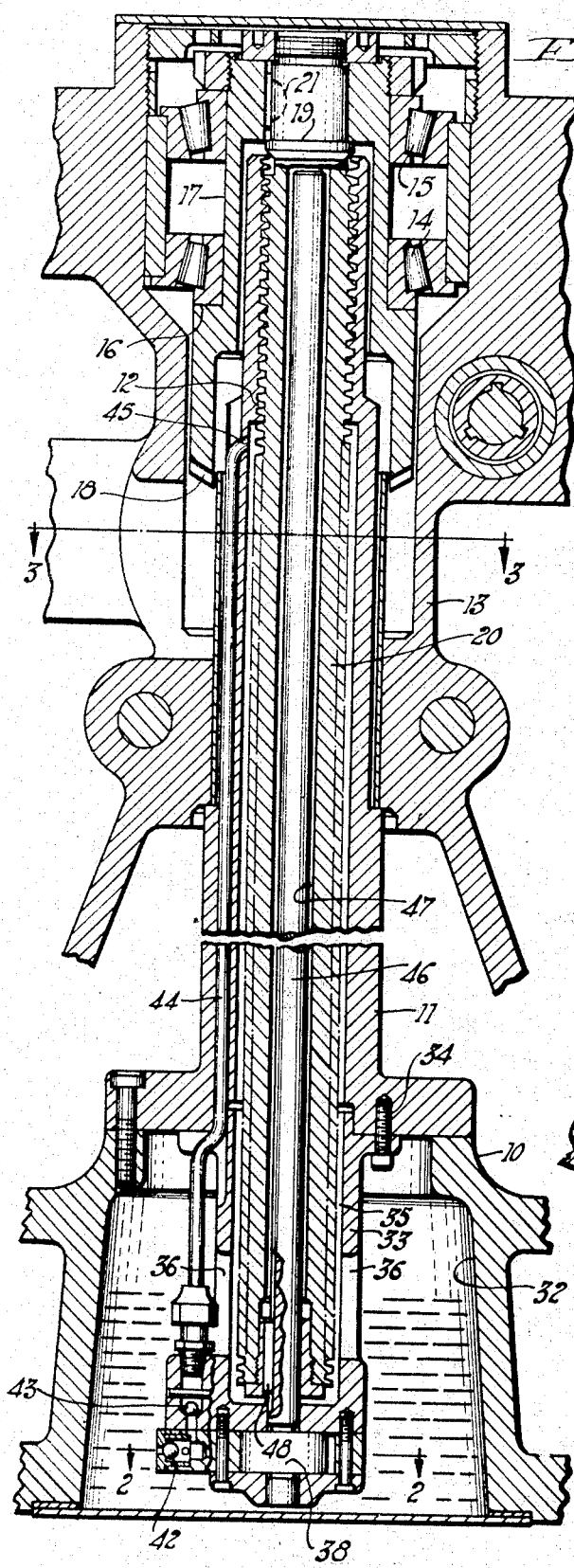
Figure 1 is a sectional elevational view of a knee elevating mechanism of a milling machine.

Referring to Figure 1 of the drawing the reference numeral 10 indicates the pedestal of a milling machine of the type disclosed in the patent supra and on top of this pedestal there is secured an uprising stump 11 which terminates in an elongated nut 12. A portion of a vertically movable knee is indicated by the reference numeral 13 and this knee is supported by anti-friction bearings 14 and 15 on a shoulder 16 formed on the elongated hub 17 of a bevel gear 18. The bevel gear is supported on a shoulder 19 formed on the upper end of an elevating screw 20, and is also secured to the screw for driving purposes by a key 21. The screw 20 is threaded through the nut 12 and extends downward through the hollow stump in telescoping relation therewith.

It will now be apparent that the entire weight of the knee is supported by the nut, and since the knee is held against rotation by its usual guides with the machine column, actuation of the bevel gear 18 will cause the screw to rotate, one direction of rotation causing upward movement of the knee, and the other direction of rotation causing downward movement of the knee. The height of the stump and the length of the screw will, of course, depend upon the size of the machine and the maximum adjustment that is required.

Figure 3:
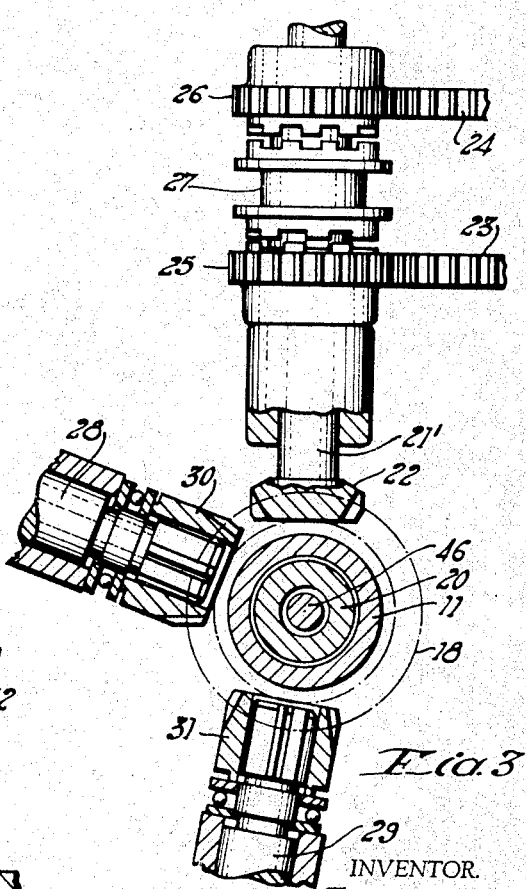
Figure 3 is a view of the actuating mechanism as viewed on the line 3—3 of Figure 1.

A known mechanism for driving the bevel gear is illustrated in Figure 3 and consists of a power actuable shaft 21' which has a bevel gear 22 secured to one end for engagement with the bevel gear 18. A pair of oppositely driven power actuated gears 23 and 24 drive the clutch gears 25 and 26 in opposite directions, the last two named gears being supported for free rotation on the shaft 21.

An intermediate clutch member 27 is splined on the shaft 21 and alternately shiftable into engagement with clutch gears 25 and 26 to effect power rotation of the elevating screw in opposite directions.

In addition, there is shown a pair of manually actuable shafts 28 and 29, the former being adapted to extend to the rear of the knee, and the latter to the front of the knee, whereby the operator may adjust the knee from either one of two working positions.

The shaft 28 has a bevel gear 30 splined thereto and intermeshing with the bevel gear 18, while the shaft 29 has a bevel gear 31 splined thereto and intermeshing with the gear 18. It will now be obvious that means are provided for power operating or manually operating the elevating screw.

Referring now to the lubricating system, the pedestal 10 is provided with a chamber 32 which forms a lubricant reservoir. A pump support or bracket 33 is attached to the lower end of the stump 11 as by bolts 34 and this bracket extends to the bottom of the reservoir. The bracket has a bore 35 which is aligned with the bore in the stump to form a continuation thereof.

The bore 35 is of sufficient length to enclose the screw when it is in its lowest position which is that indicated in Figure 1. It will be noted that there is a clearance between the screw and its tubular enclosure and this clearance space is in communication with the reservoir through elongated slots 36 formed in the wall of the housing 33. This permits the oil, which drains by gravity from the screw, to return to the reservoir.

Figure 2:
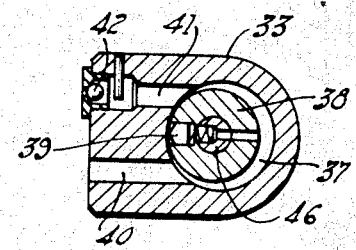
Figure 2 is a section on the line 2—2 of Figure 1.

The lower end of the support 33 is provided with a pump chamber 37 in which the pump rotor 38 rotates. This rotor is provided with an extensible vane 39 which moves radially in and out as the rotor is actuated, due to the fact that the axis of rotation of the pump rotor is eccentric to the axis of the pump chamber. When the pump rotates counterclockwise as viewed in Figure 2, the pump port 40 serves as an intake port and the pump port 41 serves as an outlet or pressure chamber. During this direction of rotation the ball check valve 42, which is mounted in the end of port 41, is closed by pressure whereby the lubricant is forced upward past the ball check 43 shown in Figure 1 into a delivery pipe or channel 44.

The delivery pipe 44 extends upward longitudinally of the stump 11 and terminates in an outlet 45 which is adjacent the lower end of the nut 12. It will now be apparent that the lubricant is delivered to the screw at the point where it enters the nut 12 during elevation of the knee and at a time when the frictional forces due to elevation are the greatest. The ball check 43 serves to prevent return flow through the pipe 44 when the pump stops, thereby maintaining the pipe 44 full of lubricant during non-actuating periods, and also preventing loss of time in delivering lubricant to the screw upon actuation in a direction to cause elevation of the knee.

The rotor 38 has a driving shaft 46 which, as shown in Figure 1, extends upward into a bore 47 formed in the screw and this shaft has a splined connection at 48 with the screw whereby rotation of the screw causes rotation of the pump rotor. Since the screw moves up and down while the shaft 46 is axially fixed, it is necessary for the shaft to be made the same length as the screw to insure a driving relationship throughout all vertical positions of the screw.

When the rotor 38 is actuated clockwise, lubricant is drawn from the reservoir past the ball check 42 and returned to reservoir through port 40 whereby no fluid is delivered to the screw and, as a matter of fact, none is necessary because the screw is moving downward at this time and lubrication of the screw would serve no useful purpose. Thus the pump is effective only upon rotation of the screw and then only when the screw is rotating in such a direction as to effect elevational adjustment of the knee.

There has thus been provided an improved lubrication system for the elevating screw of a machine tool such as a milling machine which is especially useful for parts which are infrequently utilized, and in which a continuous lubricating system would be uneconomical and wasteful.

What is claimed is:

1. In a machine tool having a stationary element, a movable element, and a screw and nut connection between said elements, the combination of means in the movable element to effect relative rotation between said screw and nut to cause relative movement between said elements, means in the stationary element for supplying lubricant under pressure to said screw at a point adjacent its entrance into the nut and means responsive to said relative rotation to effect actuation of said lubricant supplying means.

2. In a milling machine having a pedestal and a knee movable relative to said pedestal, the combination of a tubular stump uprising from said pedestal, a screw journaled in said knee and extending downward within said stump, channel means for supplying lubricant to the upper end of said stump, a pump for delivering fluid under pressure to said channel, and means for returning the excess lubricant to the lower end of said stump for redelivery to said pump.

3. In a machine tool having a shiftable support and a driving screw axially movable for effecting shifting of the support, the combination of a fixed lubricant pump, a delivery channel from said pump to said screw, and driving connections between the axially movable screw and stationary pump whereby rotation of the screw will cause lubricant to be delivered to the screw.

4. In a milling machine having a pedestal and a knee movable relative to said pedestal, the combination of an elevating screw carried by the knee, a nut fixed with said pedestal, a pump, means for delivering lubricant from the pump to the screw at a point adjacent said nut, a drive shaft for the pump, and a splined telescoping connection between the screw and drive shaft whereby the pump will only be actuated during operation of the screw.

5. In a milling machine having a fixed support and a movable support and intermeshing relatively movable threaded means for effecting relative movement between said supports, the combination of a lubricant reservoir formed in the fixed support, a vertical channel extending from the reservoir to said threaded means, a check valve in the lower end of said channel for maintaining the channel full of lubricant, and means to supply additional lubricant to said channel from said reservoir upon actuation of said threaded means.

6. In a milling machine having a pedestal and a knee vertically movable with respect to said pedestal, the combination with a vertical elevating screw for effecting said movement and a nut fixed to said pedestal and intermeshing with said screw, of a lubricant reservoir formed in said pedestal, a vane type pump located in said reservoir, said pump having two ports, one of which is an open connection to said reservoir and the other a check valve connection, a delivery channel extending to one end of said nut, a second check valve connection between said channel and said pump, said check valve being oppositely effective whereby upon rotation of the pump in one direction fluid will be delivered to said channel and upon rotation in the other direction fluid will not be delivered to said channel.

7. In a milling machine having a pedestal and a knee movable relative to said pedestal, the combination of an elevating screw journaled in the knee, a nut fixed with said pedestal and receiving said screw, a lubricant reservoir formed in the pedestal, a pump mounted in said reservoir, channel means connecting the pump for delivery of lubricant to said nut, and motion transmitting means for driving the pump from said screw.

FRED A. HASSMAN.
EDGAR D. VANCIL.